Patented July 4, 1944

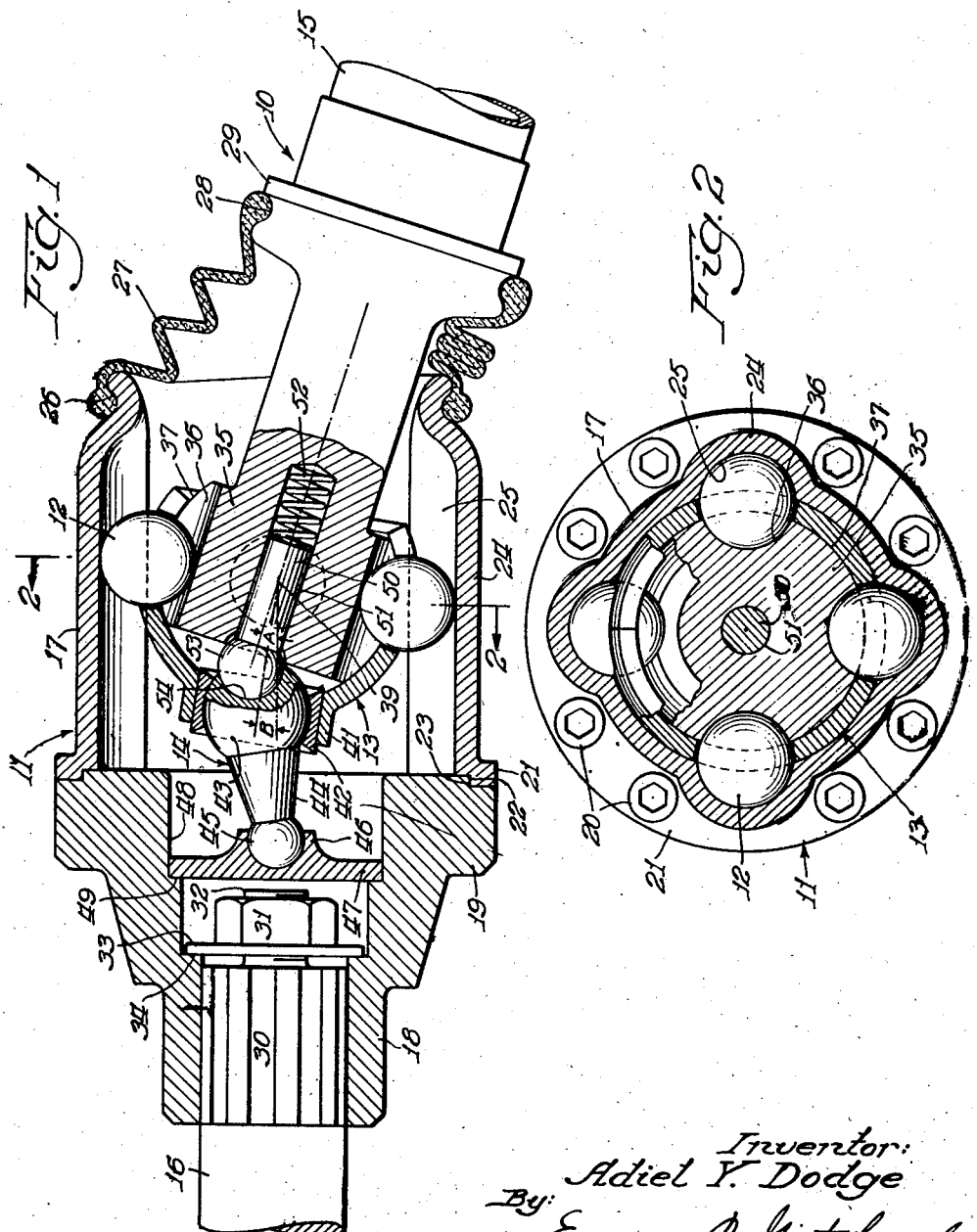

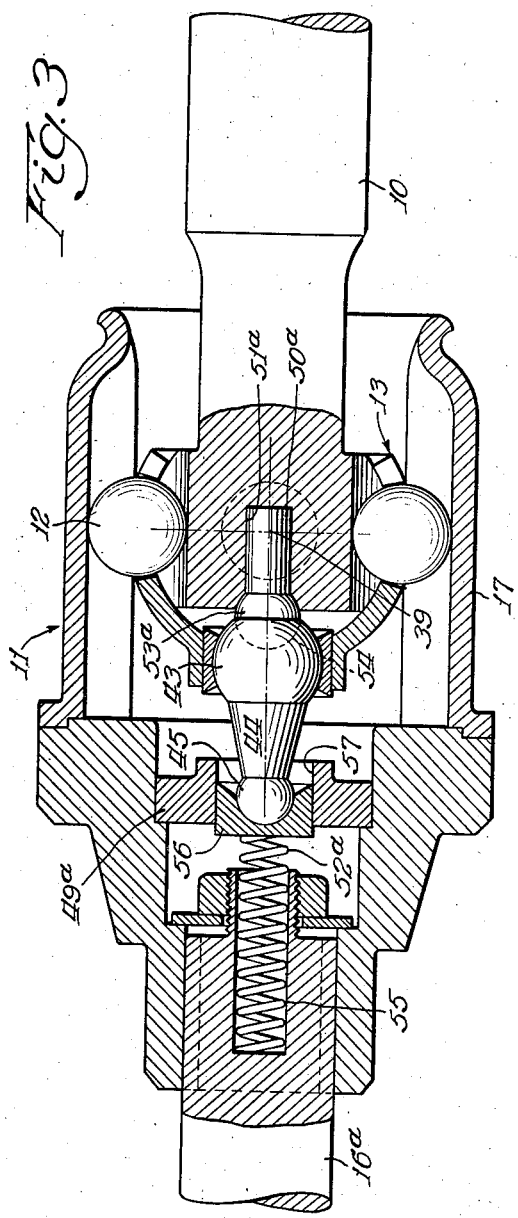

2,352,776

UNITED STATES PATENT OFFICE 2,352,776

CONSTANT VELOCITY UNIVERSAL JOINT

Adiel Y. Dodge, Rockford, Ill., assignor to Borg-Warner Corporation, Chicago, Ill., a corporation of Illinois Application February 3, 1940, Serial No. 317,044

5 Claims. (Cl. 64—21)

This invention relates to universal joints, and has as its general object to provide a relatively inexpensive constant velocity joint of the type employing, as the intermediate torque transmitting means, a series of bearing balls engaged in recesses in the respective terminal members which, in this type of joint, are customarily in the form of male and female members. In most of the constant velocity joints previously devised, the ball recesses are arcuate in longitudinal contour, on radii struck from the center of the joint. But such recesses are difficult and expensive to machine, and a primary object of the present invention is to eliminate the necessity for such expensive machining. To this end, the invention contemplates a joint wherein the recesses are straight and parallel to the axes of their respective terminal members, and wherein the female terminal member is in the form of a stamped sheet metal shell having recesses the inner surfaces of which are finished by a coining operation.

In order to achieve the constant velocity characteristic, it is necessary to control the movement of the torque transmitting balls so that they are positioned at all times in a plane bisecting the angle defined between the axes of the respective terminal members, and the present invention aims to substantially achieve this condition. It is possible to accomplish this by several means. One, which has been employed in connection with the type of joint wherein the ball recesses are arcuate, embodies the use of a cage and piloting mechanism for positively guiding the movement of the balls. Another employs an arrangement wherein the balls themselves seek the bisector plane without the assistance of piloting mechanism.

However, where the recesses are straight, there arises another problem in connection with controlling the movement of the balls. When the terminal members are not in alignment, the recesses will assume converging-diverging relationships. If a ball is allowed to move too far in the direction of the converging end of its respective recesses, it will become wedged between the recesses, and if it is allowed to move too far in the other direction, it will lose its bottoming contact with the recess of the male member. The invention has as another object to provide a joint wherein the balls will be maintained at all times in bottoming contact with both sets of recesses so as to maintain a tight torque transmitting connection and avoid lost motion.

The invention further contemplates the employment of single means, in the form of a cage and piloting mechanism, for positively controlling the movement of the balls so as to achieve both the constant velocity characteristic and the constant bottoming characteristic. I have discovered that it is possible, in a joint employing straight ball recesses, to maintain the balls substantially in the plane of the bisector, and at the same time to maintain them in constantly bottoming relation to their respective recesses, by employing a cage and piloting mechanism.

Another object of the invention is to provide a novel and improved piloting mechanism.

A further object of the invention is to provide a constant velocity universal joint which is adapted, in addition to its normal function of transmitting torque, to take up axial shifting of the terminal members relative to each other, thereby eliminating the necessity for a slip joint in either of the shafts to which the joint is attached.

Other objects, the advantages and uses of the invention will become more apparent after reading the following specification and claims, and after consideration of the drawings forming a part of the specification, wherein:

Fig. 1 is an axial sectional view of a universal joint embodying the invention, the angle of inclination between the respective terminal members being somewhat exaggerated over that of ordinary operating conditions, in order to better illustrative the operation of the joint;

Fig. 2 is a transverse sectional view of the same, taken as indicated by the line 2—2 of Fig. 1;

Fig. 3 is a longitudinal sectional view of a universal joint embodying a somewhat modified form of the invention.

As an example of one form in which the invention may be embodied, I have shown in Figs. 1 and 2 a universal joint comprising, in general, a male terminal member 10, a female terminal member or shell 11, an annular series of torque transmitting balls 12, a cage 13 in which the balls are imprisoned, and piloting mechanism 14 for determining the position of the cage 13.

The male member 10 may be formed on or secured to the forward end of a propeller shaft 15 of an automotive vehicle. The shell 11 would in that case be attached to the rear end of the tail shaft 16 of the vehicle transmission.

In accordance with the invention, the female member 11 comprises a sheet metal shell portion 17 in the shape of a fluted cylinder, and a hub portion 18 having a flange 19 to which the shell 17 is secured by means of a flange 21 formed on its one end, and a series of screws 20 extended through the flange 21 and threaded into the flange 19. The flange 21 is provided with a machined internal locating shoulder 22 adapted to snugly receive an external shoulder 23 machined on the flange 19.

The fluted portions 24 of the shell 17 have semi-cylindrical interior surfaces forming the recesses 25 in which the torque transmitting balls 12 are received. These surfaces are rapidly and inexpensively finished to smooth and accurate contour by a coining operation. Since the recesses 25 are straight, it is possible to form the shell 17 of sheet metal by a deep drawing or other suitable die forming operation. The end of the sleeve opposite the flange 21 is formed inwardly to provide a toroidal groove 26 adapted to receive and secure one end of a flexible lubricating retaining boot 27. The other end of the boot 27 may be secured in constricting engagement with a toroidal groove 28 in the shoulder 29 of the male member 10.

The hub 18 may be internally splined to receive the splined end 30 of the tail shaft 16, and adapted to be secured thereon by means of a nut 31 threaded on a reduced end portion 32 of the tail shaft and engaging, through the medium of a washer 33, a shoulder 34 formed in the hub 18.

The male member 10 is formed at its end with a head 35 provided with recesses 36 in which the inner regions of the balls 12 are received. The lateral surfaces 37 of the head 35 between the recesses 36 are spherical and are snugly received within the spherical ball cage 13. The recesses 36 are straight, semi-circular in cross-section, and parallel to the axis of the male member 10. When the axes of the members 10 and 11 are aligned, as in Fig. 3, the recesses 25 and 36 will be equidistant from each other at all points along their common axial extent. As these axes become inclined relative to each other as shown in Fig. 1, the recesses 36 will assume a converging-diverging relationship, the converging ends of the recesses moving closer together than formerly, and the opposite ends moving farther apart.

This relationship of the recesses becomes important in maintaining snug bottoming contact of the balls 12 in the respective recesses when the terminal members are inclined as shown in Fig. 1. If the recesses 36 were arcuate and concentric with the axis of the joint at 39, any movement of the balls out of a plane perpendicular to the axis of the shell 17, would result in separation from the recesses 36 (it being assumed that the parts are rotating so that centrifugal force would be effective to maintain the balls in bottoming engagement with the recesses 25) but with the converging relationship of the recesses, it is possible to maintain bottoming of the balls in both sets of recesses, by shifting the balls with reference to the recesses 36 toward the converging ends of the recesses. Such shifting is compensated for by shifting of the balls, with reference to the recesses 25, toward the diverging ends of the recesses.

The shifting toward the converging ends of the recesses 36 is so proportioned to the shifting toward the diverging ends of the recesses 25 that the plane of the balls will be maintained in positions at all times substantially bisecting the axes of the respective terminal members. I have discovered that it is possible to thus maintain the plane of the balls in the bisector of the angle of the terminal members, and at the same time to maintain the bottoming of the balls in both sets of recesses. In accordance with known principles, the maintaining of the balls substantially in the plane of the bisector of the angle between the terminal members provides for substantially constant velocity rate of transmission of drive from one terminal member to the other.

The foregoing analysis of operation is predicated upon maintenance of a fixed center 39 of pivotal movement of the joints. But the maintenance of this center 39 is in turn dependent upon the maintenance of the balls 12 in a plane intersecting the desired center 39. This is made possible by the employment of the cage 13 and the piloting mechanism 14 which will now be described.

The cage 13 terminates at one end in a cylindrical sleeve 41. Axially slidable in the sleeve 41 is a bushing 42 having a spherical interior bearing surface socketing a ball 43 formed on one end of a pilot finger 44. At the other end of the finger 44 is a spherical head 45 which is received in a semi-spherical socket 46 formed in a plate 47 received in a bore 48 of the hub 18 and abutted against a shoulder 49.

A push rod 50, slidable in a bore 51 in the end of the male member 10, under the pressure of a spring 52 compressed between the end of the push rod 50 and the end of the bore 51, has its spherical head 52 urged into engagement with a semi-spherical socket 54 in the end of the ball 43, so as to maintain the head 45 of the finger 44 constantly bottomed in the socket 46. As the axes of the terminal members become inclined, the finger 44, and with it the bushing 42, will be moved away from the end of the male member, the bushing 42 sliding in the collar 41.

The position of the cage 13 will shift in accordance with the shifting of the center of the ball 43. The center of the ball 43 swings in an arc centered at the head 45. The angle subtended between the center of the head 53 and the axis of the sleeve 17, as indicated at A of Fig. 1, may be taken as the angle of inclination of the terminal members. The angle B subtended between the center of the ball 43 and the axis of the shell 17 will be less than the angle A. The distances between the center 39 and the centers of the balls 45, 43, and 53, is so proportioned that within the normal operating range of the joint the angle B will be approximately half that of the angle A and, accordingly, the plane of the balls 12 will substantially bisect the angle between the terminal members.

The form of the invention shown in Fig. 1 is suitable for use in connection with the so-called "torque tube" type of vehicle drive, wherein the rear end of the propeller tube 15 is axially fixed with reference to the frame of the vehicle by means of a wish-bone shaped bracing member. The tail shaft 16 being also substantially fixed with reference to the chassis, not only against axial movement but against lateral movement as well, the position of the center 39 will be determined by the rear end of the propeller shaft 15. Any axial shifting of the center 39 occasioned by vertical movement of the rear end of the shaft 15 relative to the vehicle chassis (under conditions wherein the center of swinging movement of the brace member above referred to does not coincide with the center 39) will be taken up by shifting of the push rod 50 under or against the compression of the spring 52, and corresponding shifting of the bushing 42 in the collar 41.

In the form of the invention shown in Fig. 3, the compression spring 52a is located at the opposite end of the finger 44, being received in a bore 55 in the tail shaft 16a and engaged against a floating socket member 56 which is axially slidable in a bore 57 in the plate member 49a. Instead of the axially slidable push rod 50, I provide a stud 50a fixed in the bore 51a of the male member 10, and having a spherical head 53a engaged in the socket 54 of the ball 43. The ball 53a may be formed integrally with the male member 10. This form of the invention is particularly suitable for accommodating a considerable amount of axial shifting of the male member 10 with reference to the shell 17, without destroying the desired relationship between the center 39 and the centers of the balls 53a, 43 and 45, respectively. Accordingly, it is suitable for employment in connection with the "Hotchkiss" type of drive wherein the rear end of the propeller shaft 10 is floatingly arranged with reference to the chassis. Thus, the joint may constitute not only a constant velocity means for transmitting torque, but also a slip joint for compensating axial shifting between the tail shaft and the propeller shaft. Such slip joints are commonly employed in the form of separate joints. By combining the functions of the slip joint with the normal functions of a universal joint, considerable saving in expense is effected. This feature is embodied to some extent in the form of the invention shown in Fig. 1, although where considerable axial take up is desired, the form shown in Fig. 3 is preferable.

While I have described my invention in connection with one specific embodiment thereof, it is to be understood that this is by way of illustration and not by way of limitation, and the scope of my invention is defined solely by the appended claims which should be construed as broadly as the prior art will permit.

I claim:

1. In a universal joint, a female member having internal recesses, a male terminal member having at its end a spherical head provided with external recesses registering with said internal recesses, torque transmitting balls engaged in said recesses for establishing driving connection between said members, a spherical cage in which said head is socketed, and in which said balls are imprisoned, said cage having a collar, a bushing axially slidable in said collar and having an internal spherical bearing surface, a piloting finger having one end socketed in said bushing and its other end in pivotal association with said female member, and a spring pressed plunger axially slidable in said male member and having at its outer end a socketing connection with the socketed end of said finger.

2. In a universal joint, a female member having internal recesses, a male member having at its end a spherical head provided with external recesses registering with said internal recesses, a plurality of torque transmitting balls engaged in said recesses for establishing a driving connection between said members, a spherical cage in which said head is socketed and in which said balls are imprisoned, said cage having, opposite the end of said male member a collar, a bushing axially slidable in said collar, a piloting finger having one end socketed for universal movement in said bushing, a socket element axially slidable in said female member, the other end of said finger being socketed therein, a spring arranged to exert pressure against said socket member so as to maintain the same in engagement with said finger, and a projection on the end of said male member, having a universal pivotal connection with the end of said finger which is socketed in said bushing.

3. In a universal joint, a female member having internal recesses, a male terminal member having at its end a spherical head provided with external recesses registering with said internal recesses, torque transmitting balls engaged in said recesses for establishing driving connection between said members, a spherical cage in which said head is socketed, and in which said balls are imprisoned, said cage having a cylindrical collar, a bushing axially slidable in said collar, a piloting finger having one end socketed in said bushing and its other end in pivotal association with said female member, and a spring pressed plunger axially slidable in said male member and having at its outer end a socketing connection with the socketed end of said finger.

4. In a universal joint, a female member having internal recesses, a male terminal member having at its end a spherical head provided with external recesses registering with said internal recesses, torque transmitting balls engaged in said recesses for establishing driving connection between said members, a spherical cage in which said head is socketed, and in which said balls are imprisoned, said cage having a collar, a bushing axially slidable in said collar and formed internally with a spherical bearing socket, a piloting finger having one end portion pivotally received in said bushing socket, means placing the other end of said pilot finger in pivotal association with said female member, and means establishing a pivotal connection between said male terminal member and said one end portion of the piloting finger, said last means including a spherical head carried by and protruding from the end of said male member, said piloting finger being provided in said one end portion with a recessed bearing socket, said spherical head protruding from said male member being received in said bearing socket.

5. In a universal joint, a female member having internal recesses, a male terminal member having at its end a spherical head provided with external recesses registering with said internal recesses, torque transmitting balls engaged in said recesses for establishing driving connection between said members, a spherical cage in which said head is socketed and in which said balls are imprisoned, piloting means for said spherical cage comprising a tubular collar protruding from said cage, a bushing axially slidable in said collar, said bushing being formed internally to define a spherical-like bearing socket, a piloting finger-like member having a first spherical portion received in said bushing socket, a recessed spherical socket formed in a first end portion of said finger member, a spherical protuberance extending axially from said male member and received in said pilot finger socket, said pilot finger being provided with a second spherical portion spaced from said first spherical portion, means for pivotally associating said second spherical portion with said female member, and means including a compression spring for transmitting a generally axial force to said pilot finger-like member and said spherical protuberance extending from said male member.

ADIEL Y. DODGE.